(12) United States Patent
Huguenin et al.

(10) Patent No.: US 6,596,196 B2
(45) Date of Patent: *Jul. 22, 2003

(54) RARE EARTH BORATE, ITS PRECURSOR, AND LUMINOPHORE MADE THEREOF

(75) Inventors: Denis Huguenin, Asnieres-sur-Seine (FR); Pierre Macaudiere, Asnieres-sur-Seine (FR)

(73) Assignee: Rhodia Chimie, Courbevoie Cedex (FR)

(*) Notice: Subject to any disclaimer, the term of this patent is extended or adjusted under 35 U.S.C. 154(b) by 0 days.

This patent is subject to a terminal disclaimer.

(21) Appl. No.: 09/742,344

(22) Filed: Dec. 22, 2000

(65) Prior Publication Data

US 2002/0048543 A1 Apr. 25, 2002

Related U.S. Application Data

(63) Continuation of application No. 09/101,731, filed as application No. PCT/FR97/00069 on Jan. 17, 1997, now Pat. No. 6,238,523.

(30) Foreign Application Priority Data

Jan. 17, 1996 (FR) .............................. 96 00467

(51) Int. Cl.[7] .............................. C09K 11/63
(52) U.S. Cl. .............................. 252/301.4 R; 313/486; 423/263; 423/279
(58) Field of Search .................. 252/301.4 R; 313/486; 423/279, 263

(56) References Cited

U.S. PATENT DOCUMENTS

| 4,085,350 | A | * | 4/1978 | Kagami et al. ....... 252/301.4 R |
| 4,246,246 | A | | 1/1981 | Nakamura ................. 423/263 |
| 5,325,016 | A | * | 6/1994 | Srivastava ........... 252/301.4 R |
| 6,132,642 | A | * | 10/2000 | Kane ................... 252/301.4 S |
| 6,238,593 | B1 | * | 5/2001 | Huguenin et al. .... 252/301.4 R |

FOREIGN PATENT DOCUMENTS

| FR | 2 358 457 | | 3/1978 | |
| GB | 1 022 399 | | 3/1966 | |
| SU | 385498 | * | 2/1978 | ................. 423/279 |

* cited by examiner

Primary Examiner—C. Melissa Koslow
(74) Attorney, Agent, or Firm—Burns, Doane, Swecker & Mathis, L.L.P.

(57) ABSTRACT

An improved material in the form of rare-earth borate, its precursor(s) and a luminophore made thereof is provided. The material is characterizable as comprising spherical, cubic or parallelepipedal particles having an average particle size not more than 10 $\mu$m, over a narrow particle size distribution (dispersion index not greater than 0.8). The material may comprise a rare earth element having that lacks luminescence in combination with a dopant.

43 Claims, 1 Drawing Sheet

RARE EARTH BORATE, ITS PRECURSOR, AND LUMINOPHORE MADE THEREOF

This application is a continuation, of application Ser. No. 09/101,731, filed Dec. 2, 1998, which is a filing under 35 U.S.C. §371 of International Application No. PCT/FR97/00069, filed Jan. 17, 1997, now U.S. Pat. No. 6,238,523.

The present invention relates to a rare-earth borate, to a precursor thereof, to processes for their preparation and to the use of this borate as a luminophore.

The fields of luminescence and electronics are currently experiencing a period of considerable development. As an example of such development, mention may be made of the improvement of plasma systems (screens and lamps) for novel visualization and lighting techniques. One concrete application is that of the replacement of current television screens with flat screens. These novel applications require luminophoric materials having increasingly enhanced properties. Thus, besides their luminescent property, specific characteristics of morphology or of particle size are required of these materials in order to facilitate, in particular, their use in the desired applications.

More precisely, there is a requirement for luminophores having a narrow particle size distribution and, optionally, in the form of micron-sized individualized particles.

The main object of the invention is to afford products having such particle size characteristics.

Another object of the invention is to afford luminophores having enhanced luminescent properties.

A third subject of the invention is a preparation process which makes it possible to obtain products having these characteristics directly.

With this aim, the rare-earth borate of the invention is characterized in that it is in the form of cubic, parallelepipedal or spherical particles and in that it has a dispersion index of not more than 0.8.

By way of borate precursor, the invention also relates to a rare-earth boron hydroxycarbonate, characterized in that it is in the form of cubic, parallelepipedal or spherical particles and in that it has a dispersion index of not more than 0.8.

As other product, the invention moreover relates, by way of borate precursor, to an yttrium boron hydroxycarbonate also comprising terbium, this compound having luminescent properties.

The invention also covers a process for the preparation of a rare-earth boron hydroxycarbonate, characterized in that a rare-earth carbonate or hydroxycarbonate is reacted with boric acid, the reaction medium being in the form of an aqueous solution.

The invention moreover covers a process for the preparation of a rare-earth borate, characterized in that a rare-earth carbonate or hydroxycarbonate is reacted with boric acid, the reaction medium being in the form of an aqueous solution, and the reaction product is calcined.

Other characteristics, details and advantages of the invention will become even more fully apparent on reading the description which follows and from the attached drawings, in which.

Figure 1:
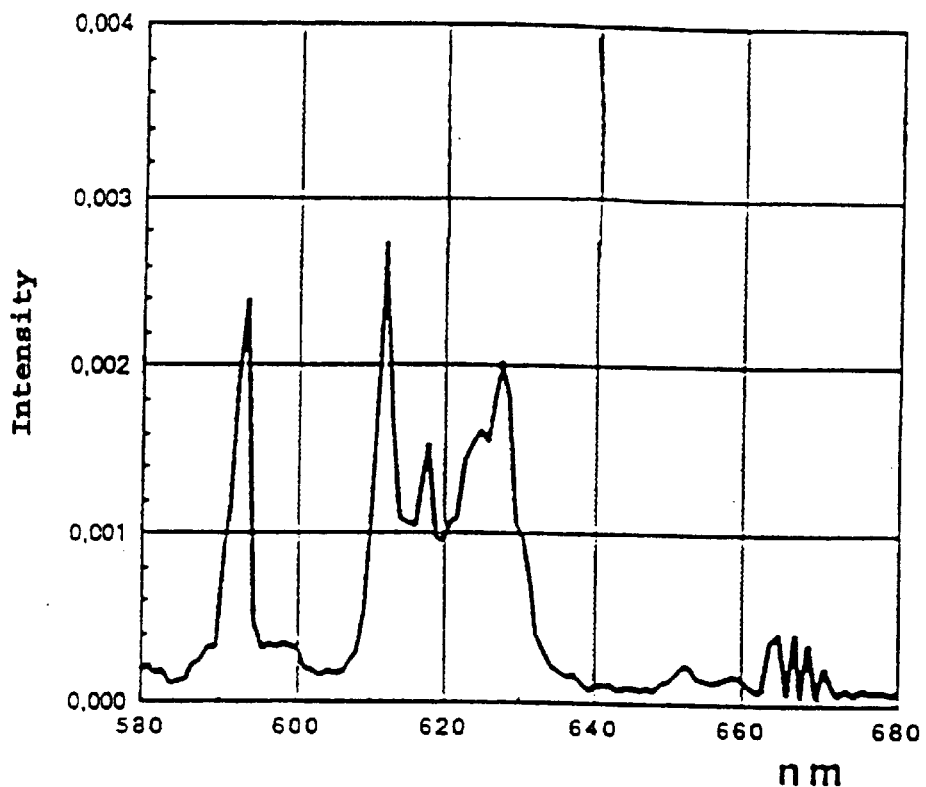
FIG. 1 is a graph giving the intensity of emission as a function of the wavelength for a europium-doped yttrium borate according to the invention, under excitation at 254 nm.
Figure 2:
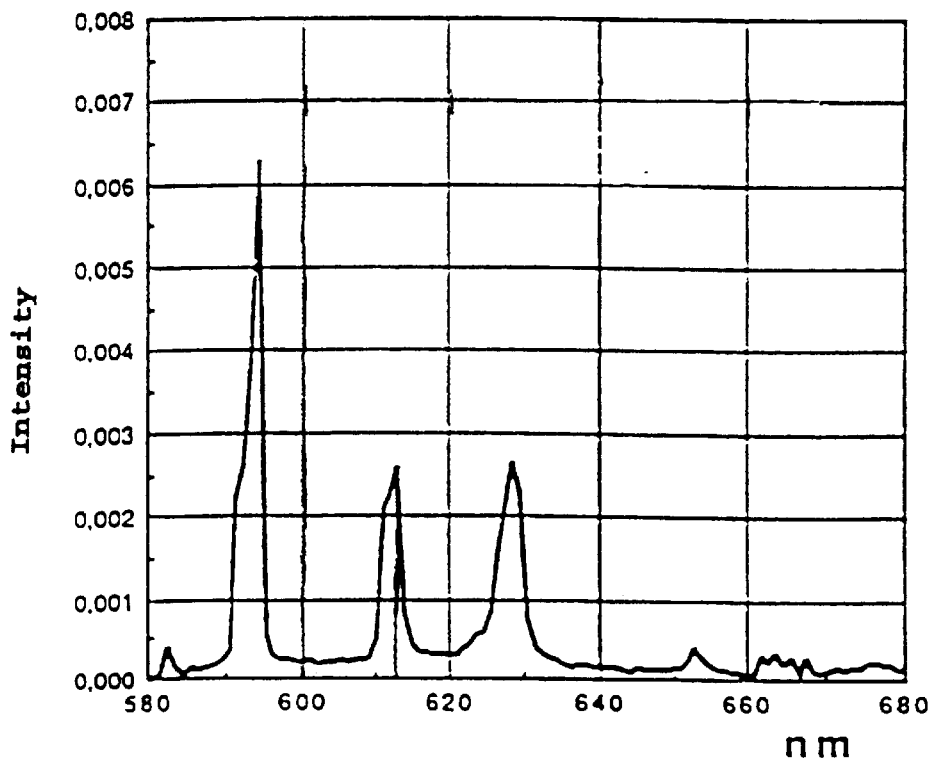
FIG. 2 is a graph giving the intensity of emission as a function of the wavelength, under the same excitation, for a product of the same formula according to the prior art, prepared by grogging.

Throughout the description, the term rare-earth is understood to refer to the elements of the group consisting of yttrium, scandium and the elements of the Periodic Table of atomic number between 57 and 71 inclusive.

The preparation processes will first be described and the products obtained in the various steps will then be studied in detail.

One characteristic of the processes of the invention is the starting material. A rare-earth carbonate or hydroxycarbonate is used at the start.

It is possible to start with a mixture of carbonates or hydroxycarbonates of different rare-earths or mixed carbonates or hydroxycarbonates of rare-earths. Indeed, the invention applies to borates of one or more rare-earths or to hydroxycarbonates of boron and of one or more rare-earths. Accordingly, throughout the description, everything which is described regarding a rare-earth borate, a rare-earth boron hydroxycarbonate and regarding processes for their preparation should be understood as applying to the case where several rare-earths are present.

Rare-earth carbonates or hydroxycarbonates are products which are known per se and which may be obtained, for example, by precipitation of one or more rare-earth salts with ammonium carbonate or bicarbonate.

The starting material is reacted with boric acid. The reaction is preferably carried out under hot conditions, for example at a temperature of between 40° C. and 90° C.

According to another characteristic of the invention, the reaction medium is in the form of an aqueous solution. This means that the amount of water present in the reaction medium is such that the water/boric acid+carbonate mass ratio is at least 300%, more particularly at least 1000%. This ratio may even more particularly be at least 1500%.

It is possible to work with an excess of boric acid. This excess may be, for example, between 5 mol % and 100 mol % ([B]/[RE]=1.05 to 2, RE=rare-earth).

It may be advantageous to carry out the reaction while removing the $CO_2$ formed during the course thereof. This removal may take place, for example, by flushing the reaction medium with a neutral gas such as nitrogen. This variant makes it possible to obtain products of finer particle size.

According to another variant, the reaction is carried out by attacking the rare-earth carbonate or hydroxycarbonate with boric acid in the mother liquors from precipitation thereof. It is advantageous to carry out this attack on a freshly prepared carbonate or hydroxycarbonate. This variant makes it possible to obtain products of spherical morphology.

At the end of the reaction, a precipitate is obtained which is separated from the reaction medium by any known means, for example by filtration, and which is optionally washed and then dried. One of the advantages of the process of the invention is that it makes it possible to obtain a precipitate which may readily be filtered and washed. After drying, an additional washing with a dilute acid, for example nitric acid, may also be carried out in order to remove any traces of carbonate which has not reacted completely.

The rare-earth boron hydroxycarbonate of the invention is thus obtained.

The process for the preparation of the borates of the invention is also characterized in that a rare-earth carbonate or hydroxycarbonate is reacted with boric acid. The precipitate is recovered after this reaction and everything which has been stated above for this reaction and the treatment of the precipitate also applies here for this first step of the process. The precipitate is then calcined.

This calcination generally takes place at a temperature of between 500 and 1400° C., more particularly between 500 and 1100° C. Given the properties of the hydroxycarbonate precipitate, it is entirely possible to carry out this calcination under air. This is a valuable advantage when compared with the processes of the prior art, which generally require reductive atmospheres. Obviously, it would not be departing from the scope of the present invention to use, for this calcination, a reductive atmosphere (for example hydrogen) or a neutral atmosphere (argon) or mixtures thereof.

After the calcination, a borate according to the invention is obtained.

Another important advantage of the process is that it makes it possible to obtain directly a borate having the desired particle size characteristics. It is not necessary, for example, to carry out grinding in order to arrive at the desired particle size.

The borate of the invention will now be described.

The rare-earth borate of the invention is essentially an orthoborate of formula $LnBO_3$, Ln representing at least one rare-earth.

The first characteristic of this borate is its morphology.

The borate of the invention may be in the form of spherical, cubic or parallelepipedal particles. The term parallelepipedal also covers products in the form of platelets, that is to say, in effect, parallelepipeds which are shorter, or very much shorter, in height than they are long.

These particles may also have a size which varies in wide proportions. According to a preferred embodiment of the invention, the average particle size is not more than 10 $\mu$m, more particularly not more than 5 $\mu$m, and, even more particularly, it may be between 0.5 and 5 $\mu$m.

Throughout the description, the average size and the dispersion index are values obtained by carrying out the technique of laser diffraction, using a granulometer of the Cilas HE 850 type (distribution on a volume basis).

The particles are of homogeneous morphology, that is to say that most of them, and preferably all of them, have this same morphology.

Another characteristic of the borate of the invention is its particle size distribution. This particle size distribution is narrow. Thus, the dispersion index $\sigma/m$ is not more than 0.8. It may more particularly be not more than 0.7 and even more particularly not more than 0.6. It is possible, in the context of the present invention, to obtain products having a dispersion index of 0.4 or 0.5.

The term dispersion index is understood to refer to the ratio:

$$\sigma/m = (d_{90} - d_{10})/2d_{50}$$

in which:

$d_{90}$ is the particle diameter for which 90% of the particles have a diameter of less than $d_{90}$;

$d_{10}$ is the particle diameter for which 10% of the particles have a diameter of less than $d_{10}$;

$d_{50}$ is the average particle diameter.

The diameters are determined by Cilas granulometry (distribution on a mass basis).

The borate of the invention may also be in the form of well-separated and individualized particles. There are few or no particle agglomerates. Consequently, the borate may be in the form of particles having a size, a dispersion index and a morphology as described above, these particles being substantially whole. The term whole particle is understood to refer to a particle which has not been broken or crushed as is the case during grinding. Scanning electron microscopy photos make it possible to distinguish crushed particles from particles which have not been crushed.

The rare-earth making up the borate of the invention, that is to say that which forms the product matrix with borate, generally belongs to the group of rare-earths which have no luminescent property. Thus, this rare-earth which makes up the borate may be chosen, alone or in combination, from the group comprising yttrium, gadolinium, lanthanum, lutetium and scandium. More particularly, it may be yttrium and/or gadolinium.

The borate may moreover comprise one or more dopants. In a manner which is known per se, the dopants are used in combination with the matrix in order to give it luminescent properties. These dopants may be chosen from antimony, bismuth and rare-earths. In the latter case, the rare-earth(s) used as dopant are chosen from the group of rare-earths with luminescent properties and they are different from the rare-earth making up the borate. As dopant rare-earth, mention may be made of cerium, terbium, europium, thulium, erbium and praseodymium. Terbium and europium are more particularly used. The content of dopant is usually not more than 50 mol % relative to the rare-earth borate matrix ([dopant]/[$\Sigma REBO_3$] ratio), $\Sigma RE$ representing all the rare-earths and dopants present in the borate. In the particular case of europium and terbium, the contents of these elements are preferably between 5 and 25% and 5 and 50% respectively. In the case of thulium, the content of thulium is preferably between 0.1 and 1%.

According to a particular embodiment, the rare-earth borate of the invention is a borate of at least one element chosen from yttrium, gadolinium, scandium and lutetium. It is characterized in that it comprises europium as dopant and in that it has an emission intensity maximum in the wavelength ($\lambda$) range between 600 and 650 nm under excitation at 254 nm. The term emission intensity maximum is understood to mean that the value of the integral of the curve: intensity=$f(\lambda)$ for values of $\lambda$ from 600 to 650 nm represents the major part of the value of the integral of the same curve for values of $\lambda$ varying throughout the visible region. Consequently, the borate according to this embodiment is a red luminophore, essentially emitting in this colour, in contrast with the luminophores of the same composition of the prior art which essentially emit in the orange region, that is to say in wavelengths less than 600 nm.

The europium content in the borate of this embodiment is generally not more 50% calculated as described above.

Lastly, in this embodiment, the rare-earth element is more particularly yttrium and/or gadolinium.

As other embodiments of the invention, mention may be made of cerium-doped gadolinium orthoborate, thulium-doped gadolinium orthoborate, both of pseudo-vaterite structure, and thulium-doped lanthanum orthoborate of aragonite structure.

By way of precursor of the borates which have just been described, the invention also relates to a rare-earth boron hydroxycarbonate.

This hydroxycarbonate is characterized in that it is in the form of cubic, parallelepipedal or spherical particles and in that it has a dispersion index of not more than 0.8.

This hydroxycarbonate may moreover comprise, as additive, an element which is of the same type as the dopants which have been described above.

The rare-earth making up the hydroxycarbonate (other than the additive) generally belongs to the group of rare-earths which have no luminescent property. Thus, this rare-earth making up the borate may be chosen from the group comprising yttrium, gadolinium, lanthanum, lutetium and scandium. It may more particularly be yttrium and/or gadolinium.

Moreover, the characteristics of particle size, morphology, homogeneity and absence of agglomeration which have been mentioned for the borates of the invention are found in the precursors. These precursors may also be in the form of whole particles in the sense given above. Thus, everything which has been described regarding the characteristics of the borates also applies here.

As other novel precursors, the invention also relates to an yttrium boron hydroxycarbonate and an yttrium gadolinium boron hydroxycarbonate, both moreover comprising terbium, which have luminescent properties in the green region. To the Applicant's knowledge, no product of this type also having luminophoric properties existed hitherto. For this precursor, the amount of terbium may be between 5 and 50%, this amount expressed as before.

Lastly, the latter precursor may also have a dispersion index of not more than 0.8 and the same cubic, parallelepipedal or spherical morphology as that described above. It may, here also, have the same characteristics of particle size, homogeneity and absence of agglomeration as those of the other hydroxycarbonates of the invention.

On account of their properties, the borates of the invention and the terbium-doped yttrium boron hydroxycarbonates described above, or as obtained by the processes described above, may be used as luminophores. They may be used, in particular, in low-voltage luminescence, in particular in the manufacture of any device using this low-voltage luminescence, such as screens with a field effect. These borates and hydroxycarbonates moreover have luminescent properties under electromagnetic excitation in the wavelength range used in plasma systems and in mercury vapour lamps. Thus, they can be used as luminophores in plasma systems (visualization screen or lighting system) or in trichromatic lamps.

Lastly, the invention also relates to luminescent devices, of the type having a screen with a field effect for example, incorporating the borates or hydroxycarbonates described above or as obtained by the processes described above. In these devices, the luminophores are placed on the screens subjected to low-energy excitation. Similarly, the invention relates to plasma systems or to mercury vapour systems in whose manufacture the borates or the hydroxycarbonates may take part. The use of the luminophores in the manufacture of low-voltage luminescence devices or plasma systems takes place according to well-known techniques, for example by silk-screen printing, electrophoresis or sedimentation.

Examples will now be given.

EXAMPLES

Two types of precursors are used for these syntheses: a rare-earth carbonate $Ln_2(CO_3)_3 \cdot xH_2O$ and a rare-earth hydroxycarbonate $LnOHCO_3$ (Ln=rare-earth).

These precursors are used in suspension in water, the carbonate and the hydroxycarbonate having been precipitated beforehand by reaction of ammonium bicarbonate and aqueous ammonia with rare-earth nitrates or co-nitrates, washed and then dried in the oven (50° C.).

A solution of boric acid is used as second reactant.

The amount of carbonate is such that the rare-earth concentration is 0.2 M after the addition of acid.

The amount of boric acid is such that a suitable B/Ln ratio is obtained.

The procedure is as follows:

The suspension of carbonate or of hydroxycarbonate, introduced into the bottom of the reactor tank, is heated to the desired temperature T and stirred vigorously. The boric acid solution is added (introduction time of about 30 min) using a peristaltic pump and the reaction mixture is left stirring for a further two hours counting from the end of the addition. The precipitate obtained is filtered off on a sinter funnel, washed with millipore water and then dried in the oven at 110° C. The powder is finally washed with a sufficient amount of dilute nitric acid in order to remove any traces of carbonate which has not reacted completely.

The powder obtained is then calcined in a muffle furnace (under air) at 1100° C. for two hours.

All the compounds described hereinbelow have the same crystallographic structure, determined by X-ray diffraction:

before calcination: $LnB(OH)_4CO_3$ (rare-earth boron hydroxycarbonate, File JCPDS 40-508)

after calcination: $LnBO_3$ (orthoborate of pseudo-vaterite structure, JCPDS 16-277).

In the examples, the particle size was determined according to the abovementioned Cilas technique. It is further pointed out that the measurement was made on a dispersion of the product in aqueous 0.05% by weight sodium hexametaphosphate solution which had previously been subjected to passage with an ultrasound probe (probe with an end piece 13 mm in diameter, 20 KHz, 120 W) for 3 minutes.

Examples 1 to 4 which follow relate to the synthesis of europium-doped yttrium orthoborate $YBO_3$.

Example 1

The precursor used is a mixed carbonate of yttrium and of europium. The final composition aimed at is $Y_{0.9}Eu_{0.1}BO_3$.

The attack temperature T=70° C. and the ratio [B]/[Ln]=1.5.

Characteristics

Before calcination, the product is in the form of small cubes with an average Cilas diameter of 2 μm and a dispersion index σ/m=0.6.

After calcination, the morphology and the size are conserved but with a slightly higher dispersion index σ/m=0.7.

FIG. 1 is a graph giving the emission intensity as a function of the wavelength for this borate under excitation at 254 nm.

Example 2

Example 1 is repeated, but with an attack temperature of 90° C.

Characteristics

Before calcination, the product is in the form of small cubes with an average Cilas diameter of 5 μm and a dispersion index σ/m=0.4.

After calcination, the morphology is entirely conserved (σ/m=0.4).

Example 3

The precursor used is a mixed hydroxycarbonate of yttrium and of europium. The final composition aimed at is $Y_{0.9}Eu_{0.1}BO_3$.

The attack temperature is 70° C. and the ratio [B]/[Ln] is 1.05.

Characteristics

Before calcination, the product is in the form of small cubes with an average Cilas diameter of 3 μm and a dispersion index σ/m=0.5.

After calcination, the morphology and the particle size remain unchanged but the dispersion index is 0.6.

Example 4

Example 3 is repeated, but with an attack temperature of 40° C.

Characteristics

Before calcination, the product is in the form of small cubes with an average Cilas diameter of 1 $\mu$m and a dispersion index $\sigma/m=0.6$.

After calcination, the morphology remains unchanged but the dispersion index is 0.7.

Example 5

This example relates to the synthesis of a europium-doped mixed orthoborate of yttrium and of gadolinium $(YGd)BO_3$.

The precursor used is a mixed carbonate of yttrium, of gadolinium and of europium. The final composition is $Y_{0.45}Gd_{0.45}Eu_{0.1}BO_3$.

The attack temperature is 70° C. and the stoichiometric ratio used [B]/[Ln] is 1.05.

Characteristics

Before calcination, the product is in the form of small cubes with an average Cilas diameter of 1.5 $\mu$m and a dispersion index $\sigma/m=0.5$.

After calcination, the morphology and the size are unchanged ($\sigma/m=0.5$).

Example 6

This example relates to the synthesis of a terbium-doped yttrium orthoborate $YBO_3$.

The precursor used is a mixed carbonate of yttrium and of terbium. The final composition aimed at is $Y_{0.8}Tb_{0.2}BO_3$.

The attack temperature is 70° C. and the stoichiometric ratio used [B]/[Ln] is 1.5.

Characteristics

Before calcination, the product is in the form of small cubes with an average Cilas diameter of 1.5 $\mu$m and a dispersion index $\sigma/m=0.7$. This product has the characteristic feature of being luminescent in the green region directly after drying at 110° C.

After calcination, the morphology remains unchanged ($\sigma/m=0.7$).

Example 7

This example relates to the synthesis of a terbium-doped mixed orthoborate of yttrium and of gadolinium $(YGd)BO_3$.

The precursor used is a mixed carbonate of yttrium, of gadolinium and of terbium. The final composition aimed at is $Y_{0.4}Gd_{0.4}Tb_{0.2}BO_3$.

The attack temperature is 70° C. and the stoichiometric ratio used [B]/[Ln] is 1.5.

Characteristics

Before calcination, the product is in the form of small cubes with an average Cilas diameter of 1.5 $\mu$m and a dispersion index $\sigma/m=0.6$. This product has the characteristic feature of being luminescent in the green region directly after drying at 110° C.

After calcination, the morphology and the size are unchanged but the dispersion index $\sigma/m$ is equal to 0.7.

Example 8

This example relates to the synthesis of a gadolinium orthoborate doped with cerium and praseodymium.

The precursor used is a mixed carbonate of gadolinium, cerium and praseodymium. The final composition aimed at is $Gd_{0.9}Ce_{0.05}Pr_{0.05}BO_3$.

The attack temperature is 70° C. and the stoichiometric ratio used [B]/[Ln] is 1.5.

Characteristics

Before calcination, the product is in the form of small cubes with an average Cilas diameter of 4 $\mu$m and a dispersion index $\sigma/m=0.5$.

Example 9

This example relates to the synthesis of a gadolinium orthoborate doped with cerium and terbium.

The precursor used is a mixed carbonate of cerium, gadolinium and praseodymium.

The final composition aimed at is $Ce_{0.3}Gd_{0.5}Tb_{0.2}BO_3$.

The attack temperature is 70° C. and the stoichiometric ratio used [B]/[Ln] is 1.5.

Characteristics

Before calcination, the product is in the form of small cubes with an average Cilas diameter of 4 $\mu$m and a dispersion index $\sigma/m=0.5$.

Example 10

Example 1 is repeated, but the attack is carried out while flushing with nitrogen so as to remove the $CO_2$ formed during the reaction more quickly. The particles obtained are of finer particle size than in the absence of flushing.

Characteristics

Before calcination, the product is in the form of small parallelepipedal grains with an average Cilas diameter of 1 $\mu$m and a dispersion index $\sigma/m=0.7$.

After calcination, the morphology is conserved. The average Cilas diameter changes to 1.5 $\mu$m whereas the dispersion index remains unchanged ($\sigma/m=0.7$).

Example 11

The same product as that of Example 1 is prepared, but the mode of synthesis consists in attacking a mixed carbonate of yttrium and of europium (freshly precipitated) directly in the mother liquors from precipitation. Boric acid in crystalline form is then added thereto and the mixture is heated at 70° C. with stirring (2 hours). The rest of the process is identical to the general procedure.

Characteristics

Before and after calcination, the product is in the form of small spheres with an average Cilas diameter of about one micron and are very monodisperse ($\sigma/m=0.5$).

Example 12

This example relates to the synthesis of a cerium-doped gadolinium orthoborate $GdBO_3$.

The precursor used is a mixed carbonate of gadolinium and of cerium. The final composition is $Gd_{0.95}Ce_{0.05}BO_3$.

The attack temperature is 70° C. and the stoichiometric ratio used [B]/[Ln] is 1.5.

Characteristics

Before calcination at 1100° C. under air, the product is in the form of small cubes with an average Cilas diameter of 2.2 µm and a dispersion index σ/m=0.6.

After calcination, the morphology remains unchanged. The product has a pseudo-vaterite structure.

Example 13

This example relates to the synthesis of a thulium-doped lanthanum orthoborate $LaBO_3$.

The precursor used is a mixed carbonate of lanthanum and of thulium. The final composition is $La_{0.99}Tm_{0.01}BO_3$.

The process is carried out as in Example 12.

Characteristics

Before calcination, the product is in the form of slightly agglomerated platelets with an average Cilas size of 4.8 µm and a dispersion index σ/m=0.75.

After calcination at 1100° C. under air, the morphology remains unchanged.

Example 14

This example relates to the synthesis of a thulium-doped gadolinium orthoborate $GdBO_3$.

The precursor used is a mixed carbonate of gadolinium and of thulium. The final composition is $Gd_{0.99}Tm_{0.01}BO_3$.

The attack temperature is 70° C. and the stoichiometric ratio used [B]/[Ln] is 1.5.

Characteristics

Before calcination, the product has an average Cilas diameter of 2.1 µm and a dispersion index σ/m=0.6. After calcination at 1100° C. under air, the morphology remains unchanged.

What is claimed is:

1. Rare-earth borate, in the form of cubic, parallelepipedal or spherical particles having a dispersion index of not more than 0.8.

2. The borate according to claim 1, comprising, as dopant, at least one element chosen from antimony, bismuth and rare-earths other than that making up the borate.

3. The borate according to claim 1, wherein the rare-earth comprises at least one of yttrium, gadolinium, lanthanum, lutetium and scandium.

4. The borate of claim 1, wherein the borate comprises europium as dopant and having an emission intensity maximum in the wavelength range between 600 and 650 nm under excitation at 254 nm.

5. The borate according to claim 2, wherein the rare earth comprises at least one of yttrium and gadolinium.

6. The borate according to claim 1, having an average particle size of not more than 10 µm.

7. The borate according to claim 1, having a content of dopant element of not more than 50 mol %.

8. A rare-earth boron hydroxycarbonate in the form of cubic, parallelepipedal or spherical particles having a dispersion index of not more than 0.8.

9. The hydroxycarbonate according to claim 8, characterized in that it moreover comprises at least one element chosen from antimony, bismuth and rare-earths other than that making up the hydroxycarbonate.

10. The borate according to claim 2, wherein the dopant rare-earth is cerium, terbium, europium, thulium, erbium and praseodymium.

11. A luminophore precursor comprising the borate according to claim 1.

12. The borate of claim 1, having a dispersion index not greater than 0.7.

13. The borate of claim 1, having a dispersion index not greater than 0.6.

14. The hydroxycarbonate of claim 8, having a dispersion index not greater than 0.7.

15. The hydroxycarbonate of claim 8, having a dispersion index not greater than 0.6.

16. The hydroxycarbonate according to claim 8, wherein the rare-earth comprises at least one of yttrium, gadolinium lanthanum, lutetium and scandium.

17. A method of use comprising using the borate of claim 2 as a luminophore.

18. A device using low-voltage luminescence, the device comprises the borate according to claim 2.

19. A plasma system, comprising a borate according to claim 2.

20. A trichromatic lamp, comprising a borate according to claim 2.

21. A material comprising a matrix and a dopant, the matrix comprising a rare earth borate having a formula $LnBO_3$, wherein Ln comprises at least one rare earth which has no luminescent property, and the dopant comprising at least one of antimony, bismuth, and a rare earth having luminescent properties, the borate having a morphology comprising spherical, cubic, or parallelepipedal particles with a dispersion index not greater than 0.8.

22. The material of claim 21, wherein the particles have a particle size not more that 10 µm.

23. The material of claim 22, wherein the material comprises no more than 50 mol % of the dopant relative to the rare earth borate matrix.

24. A material comprising a rare-earth boron hydroxycarbonate and a dopant, the hydroxycarbonate comprising at least one rare earth which has no luminescent property, and the dopant comprising at least one of antimony, bismuth, and a rare earth having luminescent properties, the hydroxycarbonate having a morphology comprising spherical, cubic, or parallelepipedal particles with a dispersion index not greater than 0.8.

25. The material of claim 24, wherein the particles have an average particle size not more that 10 µm combination with a dopant.

26. The material of claim 25, wherein the material comprises no more than 50 mol % of the dopant relative to the hydroxycarbonate.

27. A rare-earth borate, in the form of cubic, parallelepipedal or spherical whole particles having an average particle size of not more than 10 µm and having a dispersion index of not more than 0.8.

28. A rare-earth boron hydroxycarbonate in the form of cubic, parallelepipedal or spherical whole particles having an average particle size of not more than 10 µm and having dispersion index of not more than 0.8.

29. A material comprising a matrix and a dopant, the matrix comprising a rare earth borate having a formula $LnBO_3$, wherein Ln comprises at least one rare earth which has no luminescent property, and the dopant comprising at least one of antimony, bismuth, and a rare earth having luminescent properties, the borate having a morphology comprising spherical, cubic, or parallelepipedal whole particles having an average particle size of not more than 10 μm and with a dispersion index not greater than 0.8.

30. A material comprising a rare-earth boron hydroxycarbonate and a dopant, the hydroxycarbonate comprising at least one rare earth which has no luminescent property, and the dopant comprising at least one of antimony, bismuth, and a rare earth having luminescent properties, the hydroxycarbonate having a morphology comprising spherical, cubic, or parallelepipedal whole particles having an average particle size of not more than 10 μm and with a dispersion index not greater than 0.8.

31. A process forming a rare-earth boron hydroxycarbonate, the process comprising forming a suspension with a starting material comprising a rare-earth carbonate or hydroxycarbonate and reacting the starting material with boric acid in an aqueous reaction medium.

32. The process of claim 31, wherein the starting material comprises a mixture of carbonates or hydroxycarbonates of at least two different elements.

33. The process of claim 31, wherein the starting material comprises a mixture of carbonates or hydroxycarbonates of at least two different elements, at least one of the elements having luminescent properties.

34. The process of claim 31, wherein the reaction is carried out at a temperature of 40° C.–90° C.

35. The process of claim 32, wherein the aqueous solution has a water/boric acid+carbonate or hydroxycarbonate mass ratio of at least 3.

36. A process of forming a rare-earth borate, the process comprising forming a suspension with a staring material comprising a rare-earth carbonate or hydroxycarbonate, reacting the starting material with boric acid in an aqueous reaction medium, recovering precipitate formed by the reaction, and calcining the precipitate.

37. The process of claim 36, wherein the starting material comprises a mixture of carbonates or hydroxycarbonates of at least two different elements.

38. The process of claim 36, wherein the starting material comprises a mixture of carbonates or hydroxycarbonates of at least two different elements, at least one of the elements having luminescent properties.

39. The process of claim 36, wherein the precipitate is calcined in an oxygen-containing atmosphere.

40. The process of claim 36, wherein the precipitate is calcined in an argon-containing atmosphere.

41. The process of claim 36, wherein the precipitate is calcined in a reducing atmosphere.

42. The process of claim 36, wherein the reaction is carried out at a temperature of 40° C.–90° C.

43. The process of claim 36, wherein the aqueous solution has a water/boric acid+carbonate or hydroxycarbonate mass ratio of at least 3.

* * * * *

UNITED STATES PATENT AND TRADEMARK OFFICE
CERTIFICATE OF CORRECTION

PATENT NO.        : 6,596,196 B2                                                            Page 1 of 1
DATED             : July 22, 2003
INVENTOR(S)       : Denis Huguenin et al.

It is certified that error appears in the above-identified patent and that said Letters Patent is hereby corrected as shown below:

<u>Title page,</u>
Item [63], Related U.S. Application Data, change "Pat. No. 6,238,523" to
-- Pat. No. 6,238,593 --.

Signed and Sealed this

Twentieth Day of January, 2004

JON W. DUDAS
*Acting Director of the United States Patent and Trademark Office*